United States Patent
Nasr et al.

(10) Patent No.: US 8,887,927 B2
(45) Date of Patent: Nov. 18, 2014

(54) SELF-SUPPORTING DYNAMIC POLYMERIC MEMBRANE, METHOD FOR PREPARING SAME, AND USES THEREOF

(75) Inventors: Gihane Nasr, Montpellier (FR); Mihail-Dumitru Barboiu, Montpellier (FR); Christophe Charmette, Montpellier (FR); José Gregorio Sanchez Marcano, Sussargues (FR)

(73) Assignee: Centre National de la Recherche Scientifique, Paris (FR)

( * ) Notice: Subject to any disclaimer, the term of this patent is extended or adjusted under 35 U.S.C. 154(b) by 651 days.

(21) Appl. No.: 13/258,669

(22) PCT Filed: Mar. 11, 2010

(86) PCT No.: PCT/FR2010/050422
§ 371 (c)(1),
(2), (4) Date: Sep. 22, 2011

(87) PCT Pub. No.: WO2010/112722
PCT Pub. Date: Oct. 7, 2010

(65) Prior Publication Data
US 2012/0024786 A1 Feb. 2, 2012

(30) Foreign Application Priority Data
Mar. 30, 2009 (FR) ...................... 09 01539

(51) Int. Cl.
| | |
|---|---|
| *B01D 71/58* | (2006.01) |
| *B01D 71/52* | (2006.01) |
| *B01D 71/62* | (2006.01) |
| *B01D 69/14* | (2006.01) |
| *B01D 61/00* | (2006.01) |

(52) U.S. Cl.
CPC ............... *B01D 69/14* (2013.01); *B01D 71/52* (2013.01); *Y02C 10/04* (2013.01); *Y02C 10/10* (2013.01)
USPC .............. 210/500.27; 210/500.28; 210/321.6; 210/650; 210/652; 210/640

(58) Field of Classification Search
None
See application file for complete search history.

(56) References Cited

U.S. PATENT DOCUMENTS

| | | | | |
|---|---|---|---|---|
| 4,005,012 | A * | 1/1977 | Wrasidlo | 210/654 |
| 4,614,586 | A * | 9/1986 | Masuda et al. | 210/500.28 |
| 4,659,474 | A * | 4/1987 | Perry et al. | 210/638 |
| 4,690,765 | A * | 9/1987 | Linder et al. | 210/654 |
| 4,690,766 | A * | 9/1987 | Linder et al. | 210/654 |
| 4,865,745 | A * | 9/1989 | Pasternak | 210/651 |
| 4,889,636 | A * | 12/1989 | Perry et al. | 210/651 |
| 4,982,051 | A * | 1/1991 | Pasternak et al. | 585/818 |
| 4,985,138 | A * | 1/1991 | Pasternak | 208/308 |
| 5,037,555 | A * | 8/1991 | Pasternak et al. | 210/642 |
| 5,085,778 | A * | 2/1992 | Reale, Jr. | 210/500.39 |
| 5,152,901 | A * | 10/1992 | Hodgdon | 210/654 |
| 5,160,046 | A * | 11/1992 | Pasternak | 210/640 |
| 7,339,008 | B2 | 3/2008 | Sanchez et al. | |
| 8,268,933 | B2 * | 9/2012 | Luo et al. | 525/375 |
| 2008/0141863 | A1 | 6/2008 | Liu et al. | |
| 2012/0107720 | A1 * | 5/2012 | Nasr et al. | 429/492 |

OTHER PUBLICATIONS

International Search Report Dated Aug. 4, 2010.

* cited by examiner

*Primary Examiner* — Krishnan S Menon
(74) *Attorney, Agent, or Firm* — Sofer & Haroun, LLP

(57) ABSTRACT

A method of preparation for polyimine self-supported dynamic polymeric membranes (called "dynameric" membranes) is provided along with their use in separation processes, especially for separating gaseous species.

14 Claims, 3 Drawing Sheets

SELF-SUPPORTING DYNAMIC POLYMERIC MEMBRANE, METHOD FOR PREPARING SAME, AND USES THEREOF

RELATED APPLICATIONS

This application is a National Phase application of PCT/FR2010/050422, filed on Mar. 11, 2010, which in turn claims the benefit of priority from French Patent Application No. 09 01539 filed on Mar. 30, 2009, the entirety of which are incorporated herein by reference.

BACKGROUND

1. Field of the Invention

The present invention relates to self-supporting dynamic polymer membranes ("dynamer" membranes) of polyimine type incorporating metal ions, to a process for preparing them and to their use in separation processes, especially for gaseous species.

2. Description of Related Art

Various types of process exist for separating chemical species, such as cryogenics, distillation, solvent absorption (chemical or physical), adsorption and membrane separation.

In the field of separation of gaseous species, in particular in the treatment of natural or synthetic gases, the separation and purification of the components is essential in order to satisfy the increasing needs of the users. Thus, crude natural gas and the derived components must be freed, inter aka, of the carbon dioxide contained by means of an operation known as deacidification.

Among the various separation processes known in the prior art, membrane separation is the least energy intensive and is among the processes that are the most widely used at the industrial level.

Among the membrane processes, the following are distinguished:
- processes using microporous inorganic membranes essentially composed of alumina, silica, zeolites or carbon. These processes are efficient, tolerate moderate flows and also high temperatures and pressures, but are expensive. Furthermore, the selectivity factors of inorganic membranes with respect to the chemical species to be separated remain moderate;
- processes using polymeric membranes are less expensive in raw material and energy terms. However, the membranes used degrade quickly. The development of organic membranes and their uses for gas separation have been envisioned with the aid of polymers of very varied structures. The majority of the processes industrially used involve membranes manufactured as vitreous polymers, for instance, polyimides, polysulfones and polyphenylene oxides since they generally have greater selectivity and better mechanical properties, but, in counterpart, they accept a smaller separation flow than inorganic membranes since they have insufficient permeability. Other polymers, for instance elastomers such as polysiloxanes, for example, have also been used. They have permeability higher than that of membranes manufactured from vitreous polymers, but are less selective toward the gaseous species to be separated (A. Stern, J. of Membr. Sci., 1994, 94; S. T. Hwang et al., Separation Science, 1974, 9(6)). In general, it has been found that there is an inverse relationship between selectivity and permeability: the better the selectivity, the lower the permeability. Thus, even though membrane processes represent an advance compared with more standard processes, they still need to be improved especially because the membranes used remain expensive and because it is often necessary to make a choice between a high flow (high permeability) and high selectivity.

The selectivity of the polymeric membranes used toward the chemical species to be separated is, moreover, modulable only if the chemical nature and/or the content of the monomers constituting them are varied. Membranes for the selective separation of gases, formed from a copolymer of ethylene oxide (EO) and of epichlorohydrin (EP) have thus already been proposed, in particular in patent application EP 1 322 409, some of the ethylene oxide units possibly being replaced with propylene oxide (PO) units. These membranes are useful in particular for the selective separation of the carbon dioxide ($CO_2$) contained in a gaseous mixture. The best selectivity toward $CO_2$ is obtained with a membrane formed from EO/EP/PO units in proportions of 85/2/13 (mol %). The article by Sanchez J. et al. (Membrane Science, 2002, 205, 259-263) relates a study of the permeability of self-supporting films obtained from crosslinked copolymers of poly(ethylene oxide) (PEO) and of epichlorohydrin. It is indicated therein that it is possible to vary the $CO_2$ permeability properties by varying the PEO/epichlorohydrin (PEO/EP) ratio. The best results are obtained with copolymers containing between 87% and 96% of ethylene oxide units, the maximum $CO_2$ permeability being obtained with a content of 93%.

OBJECTS AND SUMMARY

There is thus a need for polymeric membranes that can be manufactured via a simple and inexpensive process and that afford both high selectivity toward the species that it is desired to separate while at the same time conserving the possibility of working with acceptable flows.

It is also desirable to have available polymeric membranes whose selectivity can be modulated simply without needing to vary the chemical nature and/or the content of the monomers constituting them.

The aim of the present invention is thus to provide organic polymeric membranes that have both high selectivity toward the chemical species to be separated and that can be modulated easily, while at the same time having good permeability, said membranes being able to be prepared via a simple and inexpensive process.

One subject of the present invention is a self-supporting polymeric membrane, characterized in that it is formed from a dynamic polymer formed from repeating units of formula (I) below:

in which:

D represents a subunit of formula ($I_D$) below:

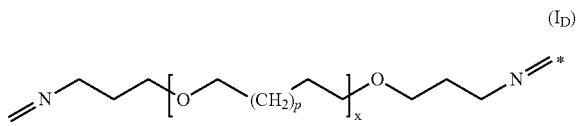

in which:
- x is an integer ranging from 10 to 20;
- p=0 or 1; and
- \* is the point of attachment of D to G via an imine bond;

G represents a subunit of formula ($I_G$) below:

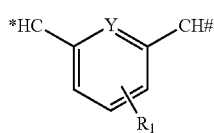

(I_G)

in which:
- $R_1$ represents a hydrogen atom or an alkyl radical containing from 1 to 4 carbon atoms,
- Y represents a nitrogen atom or C—OH,
- # is the point of attachment of G to D via an imine bond;

it being understood that at least 50% by number of said subunits of formula ($I_G$) present in said polymer form a complex with a transition metal ion.

These membranes have good elastic properties and high thermal stability (about 280° C.). They also have improved $CO_2$ permeability. Furthermore, the metal ions create crosslinking points for the polymer chain and make it possible to modulate the selectivity of the membranes as a function of the chemical species to be separated. Moreover, the imine bonds, which are by nature reversible bonds, give the membranes rearrangement, self-distribution and selectivity properties (whence arises the term "dynamic polymer"), which promotes their recycling and is thus environmentally friendly.

According to the invention, the transition metal ion is preferably chosen from $Zn^{2+}$, $Fe^{2+}$, $Cu^+$, $Ni^{2+}$, $Co^{2+}$ and $Ag^+$.

Among the alkyl radicals mentioned for the radical $R_1$ of the subunit of formula ($I_G$), mention may be made of methyl, ethyl, n-propyl, n-butyl and t-butyl radicals. According to one preferred embodiment of the invention, $R_1$ represents a t-butyl radical, and even more preferentially a t-butyl radical in the para position relative to Y.

According to one preferred embodiment of the invention, the subunit ($I_G$) is chosen from the subunits ($I_{G1}$) and ($I_{G2}$) below:

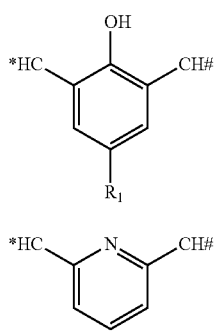

In the subunit of formula ($I_{G1}$) above, the radical $R_1$ has the same meanings as those indicated above for the subunit of formula ($I_G$). According to one particularly preferred embodiment of the invention, $R_1$ represents a t-butyl radical.

The subunits of formulae ($I_G$) have the particular feature of being capable of forming complexes with transition metals, which serve firstly as a point of crosslinking of the polymer of formula (I) and which secondly bind reversibly to the species to be separated out and facilitate their passage through the membrane.

The selectivity of the membrane toward a given chemical species may thus be modulated by varying the nature of the transition metal used (separation of olefins/paraffins with Ag(I) or Cu(I), separation of $N_2$ relative to $O_2$ with Co(II), etc.), separation of $CO_2$ with Zn(II) which forms a complexing site for carbon dioxide.

Membranes incorporating subunits of this type moreover have permeability and solubility properties that are improved with respect to certain gaseous species such as $CO_2$.

According to one preferred embodiment of the invention, the numerical percentage of subunits of formula ($I_G$) complexed to a transition metal ion ranges from 50% to 200%.

The inventors have, in point of fact, discovered that when this percentage is less than 50, the membranes are very permeable but do not have sufficient selectivity, and when this percentage is greater than 200, the membranes have very high selectivity, but, in counterpart, insufficient permeability.

The self-supporting membrane in accordance with the present invention may have a thickness ranging from 300 to 600 μm approximately and preferably from 200 to 400 μm approximately.

A subject of the present invention is also a process for preparing a self-supporting polymer membrane, formed by at least one dynamic polymer formed from repeating units of formula (I) as defined above, said process being characterized in that it comprises the following steps:

a) the preparation of a reaction mixture comprising, in solution in at least one organic solvent:
- at least one precursor of a subunit D chosen from the precursors of formula ($I'_D$) below:

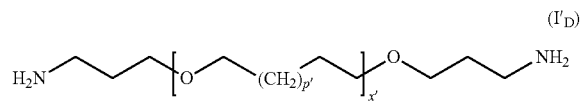

(I'_D)

in which x' is an integer ranging from 10 to 20 and p'=0 or 1, and
- at least one precursor of a subunit G chosen from the precursors of formula ($I'_G$) below:

(I'_G)

in which $R'_1$ represents a hydrogen atom or an alkyl radical containing from 1 to 4 carbon atoms and Y' represents a nitrogen atom or C—OH;

b) the polycondensation of said precursors by heating the reaction mixture to reflux to obtain a dynamic polymer formed from repeating units of formula (I') below:

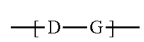

(I')

in which:

D represents a subunit of formula ($I_D$) below:

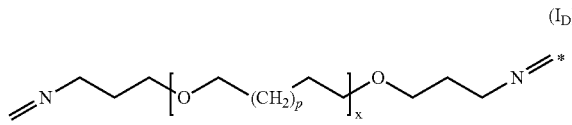

in which:
  x is an integer ranging from 10 to 20;
  p=0 or 1; and
  * is the point of attachment of D to G via an imine bond;
G represents a subunit of formula ($I_G$) below:

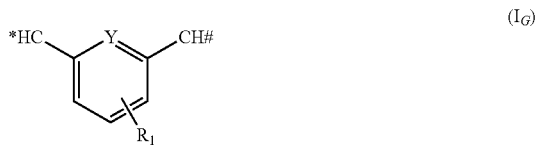

in which:
  $R_1$ represents a hydrogen atom or an alkyl radical containing from 1 to 4 carbon atoms,
  Y represents a nitrogen atom or C—OH,
  # is the point of attachment of G to D via an imine bond;
c) the dissolution of the polymer thus obtained in an organic solvent medium to obtain a solution of polymer (Solution P),
d) the dissolution of a transition metal salt of formula (II) below:

$$M_m(A)_n \quad (II)$$

in which:
  M is a transition metal ion preferably chosen from $Zn^{2+}$, $Fe^{2-}$, $Cu^+$, $Ni^{2-}$, $Co^{2+}$ and $Ag^+$,
  A is a monovalent or divalent anion, and
  m and n are chosen such that the electrical neutrality of the salt is respected,
in a solvent to obtain a solution of said salt of formula (II) (solution S),
e) the addition, to said solution P, of solution S, in an amount such that at least 50% by number, and preferably from 50% to 200% by number, of the subunits of formula ($I_G$) present in the polymer are complexed to a transition metal ion,
f) the forming of the membrane and the evaporation of the solvent(s) from the reaction medium.

Among the anions A of the salt of formula (II), mention may be made especially of acetate, trifluoromethanesulfonate, tetrafluoroborate, hexafluorophosphate, nitrate and perchlorate anions. Among these anions, acetate is particularly preferred.

The salt of formula (II) preferably represents from 0.5 to 2 equivalents relative to the total mass of a repeating unit of formula (I').

The solvent medium is preferably formed by an organic solvent chosen from tetrahydrofuran (THF), trichloromethane ($CHCl_3$), dichloromethane ($CHCl_2$), and mixtures thereof.

According to one preferred embodiment of this process, the solvent(s) used are in anhydrous form.

The polycondensation of the various subunits is performed at reflux, for a time that may range from 12 to 24 hours.

The solvents of the solution S, i.e. the solvents used to dissolve the salt of formula (II), are preferably chosen from lower alcohols such as ethanol, methanol and acetonitrile. Methanol is particularly preferred.

The forming of the membranes may be performed, for example, by pouring the reaction medium into a mold having a shape corresponding to the shape of the membrane that it is desired to obtain or by coating onto a suitable support, followed by evaporation of the organic solvent(s).

This process is simple, reproducible and inexpensive to implement and leads to the production of the polymer in a yield of 100%. It is ecological insofar as it does not require great energy expenditure and generates only a small amount of water as byproduct of the polycondensation reaction.

The self-supporting membranes of the invention may be used in processes for the membrane separation of chemical species, in particular.

The membranes of the invention are particularly efficient for the selective separation of gaseous mixtures. The membranes in which the subunits of formula ($I_G$) are complexed with $Zn^{2+}$ ions have in particular improved selectivity toward carbon dioxide. This is why the membranes of the invention are of great interest in various industrial fields involving carbon dioxide.

Thus, a subject of the invention is also the use of a self-supporting membrane as defined previously, for the selective separation of chemical species, in particular for the selective separation of gaseous species contained in natural or industrial gases. According to one preferred embodiment, the metal ions are $Zn^{2+}$ ions and the membrane is used for the selective separation of carbon dioxide.

Another subject of the invention is thus a process for separating out a chemical species, and in particular a gaseous species such as carbon dioxide, which consists in passing a gaseous or liquid mixture containing the species that it is desired to separate out through a self-supporting polymer membrane in accordance with the invention and as described previously, in which the metal ions are preferably $Zn^{2+}$ ions.

The membranes in accordance with the invention may also be used:
  for separating hydrocarbons,
  for recovering volatile organic compounds,
  for the facilitated transportation of $Na^+/K^+$ ions.

BRIEF DESCRIPTION OF THE DRAWINGS

The present invention can be best understood through the following description and accompanying drawings, wherein.

DETAILED DESCRIPTION

Figure 1:
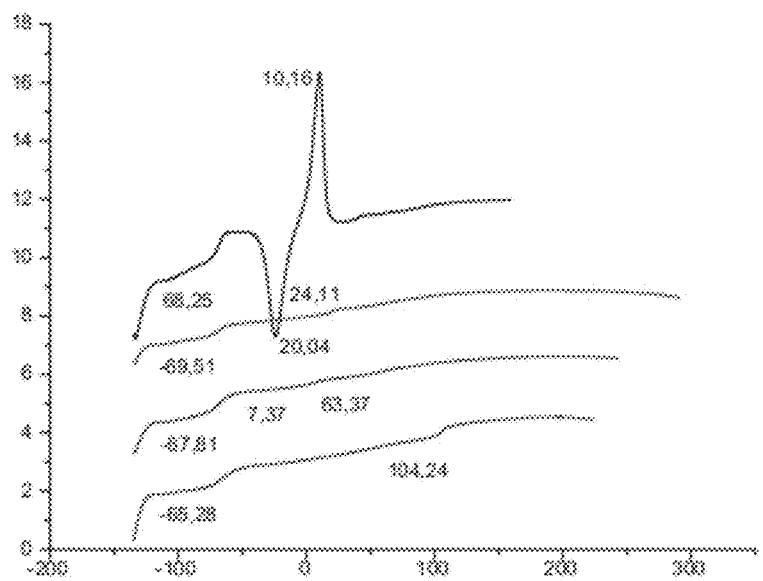
FIG. 1 is a chart showing a differential scanning calorimetry analyses of the various membranes, in which the flow of heat (in watts/g) is a function of the temperature in ° C., relating to example 1, in accordance with one embodiment.

The present invention is illustrated by the following production examples, to which it is not, however, limited.

EXAMPLES

The structure of the membranes prepared in the examples that follow was studied by differential scanning calorimetry using a calorimeter sold under the trade name TA Instruments 2920 Modulated DSC by the company Perkin-Elmer.

Analyses by Fourier-transform infrared spectroscopy (or FTIR) were performed on a spectrometer sold under the name Nicolet Nexus FTIR/ATR Diamond by the company ThermoFischer.

The determination of the coefficients of permeability and of diffusion of the various membranes was performed by the time-lag method using a frontal permeameter formed from two permeation cells separated by the test membrane. The membrane and the two compartments were first degassed under secondary vacuum for at least 48 hours, using a molecular turbopump with a delivery of 50 l·$s^{-1}$, sold under the trade name Turbovac 50 by the company Leybold. The two compartments were then isolated, followed by introduction of the gas to be studied into the compartment located upstream of the membrane, at a pressure of $3.0 \times 10^5$ Pa, this pressure being higher than the pressure measured in the compartment located downstream of the membrane. The pressure rise in the compartment downstream of the membrane was recorded using a pressure transmitter sold under the trade name Baratron by the company MKS Instruments. This method is based on measurement at constant volume and variable pressure. The curve obtained makes it possible to determine, via resolution of Fick's second law, the coefficient of diffusion during the transient regime and the coefficient of permeability when the pseudostationary regime is reached.

The solubility (S) coefficients of the various membranes were determined using a Cahn-1000 model etectrobalance, the functioning of which is based on the principle of gravimetry, sold by the company Cahn (USA).

Example 1

1) Synthesis of Membranes Formed from Polymers Formed from Repeating Units of Formula (I) in the Presence of Various Amounts of a Zinc Salt The membranes were obtained by polycondensation of the subunits D and G, using the following precursors:

Precursor of the subunit D: poly(tetrahydrofuran)bis(3-aminopropyl) containing amine end groups:

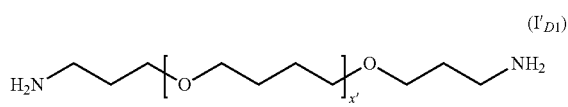

in which x' is such that the precursor of formula ($I'_{D1}$) has a molecular mass of about 1100 g/mol;

Precursor of the subunit G: 4-tert-butyl-2,6-diformylphenol:

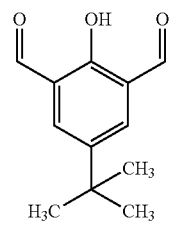

1 equivalent (0.2 g) of 4-tert-butyl-2,6-diformylphenol and 1 equivalent (1.0668 g) of poly(tetrahydrofuran)bis(3-aminopropyl) containing amine end groups ($I'_{D1}$) were dissolved in 250 ml of THF and then heated to reflux with magnetic stirring for 48 hours. The polymer solution thus obtained was evaporated and dried under vacuum.

Four identical polymer solutions were then prepared by dissolving 0.7 g of polymer in 4 ml of THF.

In parallel, various solutions of zinc acetate ($Zn(CH_3COO)_2$) in 2 ml of methanol were prepared:

Solution $S_{0.5}$ containing 0.5 eq. of $Zn(CH_3COO)_2$ (i.e. 0.060 g),

Solution $S_1$ containing 1 eq. of $Zn(CH_3COO)_2$ (i.e. 0.121 g), and

Solution $S_2$ containing 2 eq. of $Zn(CH_3COO)_2$ (i.e. 0.242 g).

In these solutions $S_{0.5}$, $S_1$ and $S_2$, the number of equivalents of zinc acetate is expressed relative to the mass of the repeating unit of the polymer ($M_{repeating\ unit}$=1270.24 g·$mol^{-1}$).

Various members $M_{0.5}$, $M_1$ and $M_2$ were then prepared by adding, respectively, dropwise and with stirring, the solutions $S_{0.5}$, $S_1$ and $S_2$ to three of the four polymer solutions. A color change from yellow to orange was observed. This color change is evidence of the instantaneous formation of the complexes between the subunits G and the $Zn^{2+}$ ions. Each of the mixtures thus obtained was then poured into a Teflon® Petri dish 3.7 cm in diameter. For comparative purposes, the fourth polymer solution was poured directly into a 3.7 cm Teflon® Petri dish without prior addition of any zinc acetate solution. The mixtures were dried at room temperature for 2 days in the absence of dust and then under vacuum at 60° C. for a further 3 days. The membranes $M_{0.5}$, $M_1$ and $M_2$ and the membrane $M_0$ not comprising any $Zn^{2+}$ ions were thus obtained.

The thicknesses of the self-supporting membranes obtained were of the order of 300 to 600 μm.

The characteristics and structures of each of the membranes thus prepared were as follows:

Membrane $M_0$

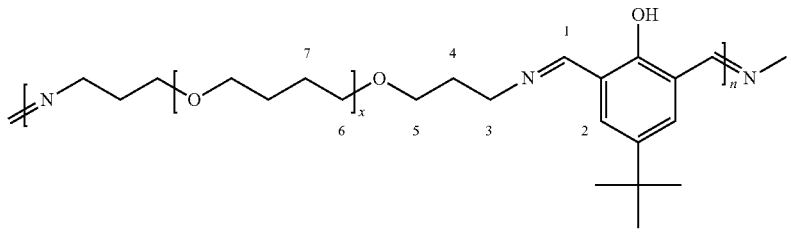

$^1$H NMR (300 MHz, CDCl$_3$): 8.49 (br, 2H, CH=N); 7.57 (br, 2H, CH-2); 3.55 (t, 4H, CH-5); 3.41 (t, 4H, CH-3); 3.39 (br, 5'H, CH-6); 1.92 (t, 4H, CH-4); 1.53 (br, 54H, CH-7); 1.14-1.24 (m, 9H, tBu).

IR (cm$^{-1}$): 2937, 2852, 2795, 1636.1598, 1465, 1446, 1364, 1206, 1103

Analysis by Differential Scanning Calorimetry (DSC):
1$^{st}$ cycle: Glass transition temperature: Tg=−68.5° C.,
Crystallization temperature: Tc=−14.80° C.,
Melting point: Tm=9.23° C.,
Heat of fusion: DHm=23.06 J/g.
2$^{nd}$ cycle: Tg=−68.25° C.
Tc=−24.11° C.
Tm=10.16° C.
DHm: 30.62 J/g Membrane $M_{0.5}$

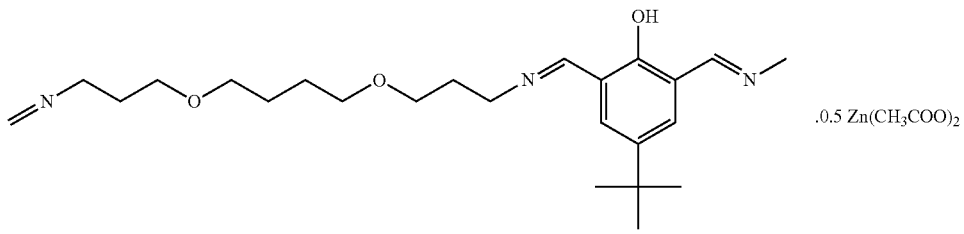

$^1$H NMR (300 MHz, CDCl$_3$): 8.32-8.18 (d br, 2H, CH=N); 7.42 (br, 2H, CH-2); 3.53 (br, 4H, CH-5); 3.22 (br, 58H, CH-6.3): 1.76-1.62 (m, 5.5H, CH-4, CH$_3$—COO$^-$); 1.41 (br, 54H, CH-7); 1.1 (m, 9H, tBu).
DSC 1$^{st}$ cycle: Tg: −68.25° C.; 29.50° C.
DSC 2$^{nd}$ cycle: Tg: −69.51° C.; 20.04° C.

Membrane $M_1$

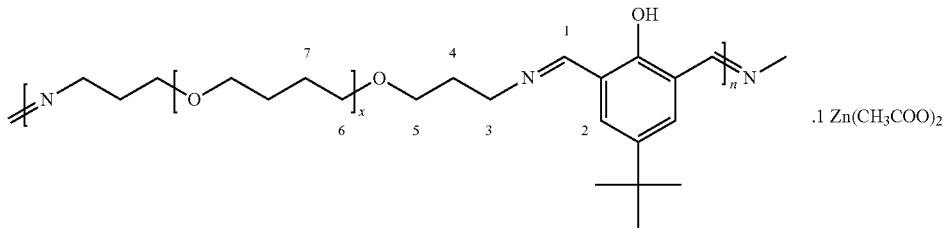

$^1$H NMR (300 MHz, CDCl$_3$): 8.11 (br, 2H, CH=N); 7.45 and 7.31 (d br, 2H, CH-2); 3.51 (br, 4H, CH-5); 3.28 (br, 58H, CH-6.3); 1.92 (s, 3H, CH$_3$—COO$^-$); 1.82 (br, 4H, CH-4); 1.47 (br, 54H, CH-7); 1.11 (m, 9H, tBu).

IR (cm$^{-1}$): 2933, 2652, 2794, 1609, 1581, 1412, 1363, 1232, 1206, 1104, 1023, 841, 777, 667, 614, 498.

DSC 1$^{st}$ cycle: Tg: −67.30° C.; 12.41° C.

DSC 2$^{nd}$ cycle: Tg: −67.81° C.; 7.37° C.

Membrane M$_2$ shifts towards lower wavenumbers, also for $\nu_{CHAr}$=1446.75 cm$^{-1}$ which shifts to 1412.26 cm$^{-1}$.

The appearance of the two bands ν(Zn—O) at 666.76 cm$^{-1}$ and ν(Zn—N) at 477.81 cm$^{-1}$ indicates the formation of complexes between the subunits G and the Zn$^{2+}$ ions present in the membrane M$_2$.

The degree of swelling of the membranes M$_0$, M$_{0.5}$, M$_1$ and M$_2$ in water or in a water/THF mixture (8/2) was also studied. The solvent exchange sites may in fact be solvated, whereas

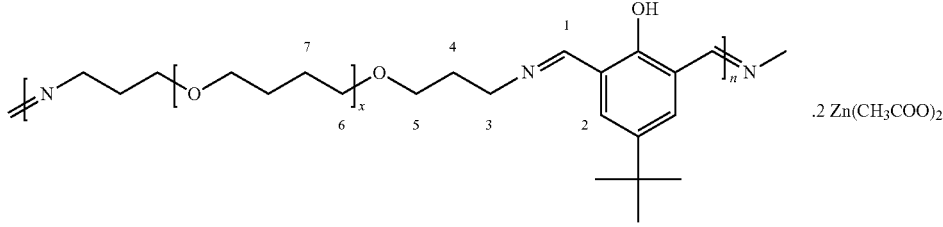

$^1$H NMR (300 MHz, CDCl$_3$): 8.13 (br, 2H, CH=N); 7.25 (br, 2H, CH-2); 3.70 (br, 4H, CH-5); 3.40 (br, 58H, CH-6.3); 1.90 (s, 6H, CH$_3$—COO$^-$); 1.82 (br, 4H, CH-4); 1.51 (br, 54H, CH-7); 1.20 (m, 9H, tBu).

IR (cm$^{-1}$): 2933, 2652, 2794, 1609, 1581, 1412, 1363, 1232, 1206, 1104, 1023, 841, 777, 667, 614, 498.

DSC 1$^{st}$ cycle: Tg=−63.77° C.; 129.97° C.

DSC 2$^{nd}$ cycle: Tg=−65.28° C.; 104.24° C.

It emerges from the values given above that the presence of Zn$^{2+}$ has a slight influence on the Tg values, which increase from −68.25 (M$_0$) to −63.77 (M$_2$). The polymer of membrane M$_0$ has a crystallization temperature of −24.11° C., which disappears for the membranes incorporating Zn$^{2+}$. The crosslinking created by the complexation of the subunits G in the presence of Zn$^{2+}$ eliminates the crystalline part of the polymer.

Moreover, the physical and mechanical strength of the polymers is proportionately greater the larger the amount of crosslinking agent, i.e. of Zn$^{2+}$ ions.

A powder X-ray diffraction analysis on these membranes was performed and showed the amorphous nature of the polymers. The diffractograms (not shown) essentially show a halo (broadened line) at a value of 2θ=21-23° (d=4.5-4.8 A°) which are representative of the distances of hydrogen interactions between the parallel polymer chains having Van der Waals contact distances.

The differential scanning calorimetry analyses of the various membranes are shown in the attached FIG. 1, in which the flow of heat (in watts/g) is a function of the temperature in ° C. In this figure, the curves correspond, respectively, in this order, starting from the top curve, to the membranes M$_0$, M$_{0.5}$, M$_1$ and M$_2$.

These curves reveal that the polymers constituting the membranes are elastomers with glass transition temperatures of between −69.51 and −63.77° C.

Demonstration of the phenomenon of complexation between the subunits G and the Zn$^{2+}$ ions was especially performed by Fourier-transform infrared spectroscopy.

Figure 2:
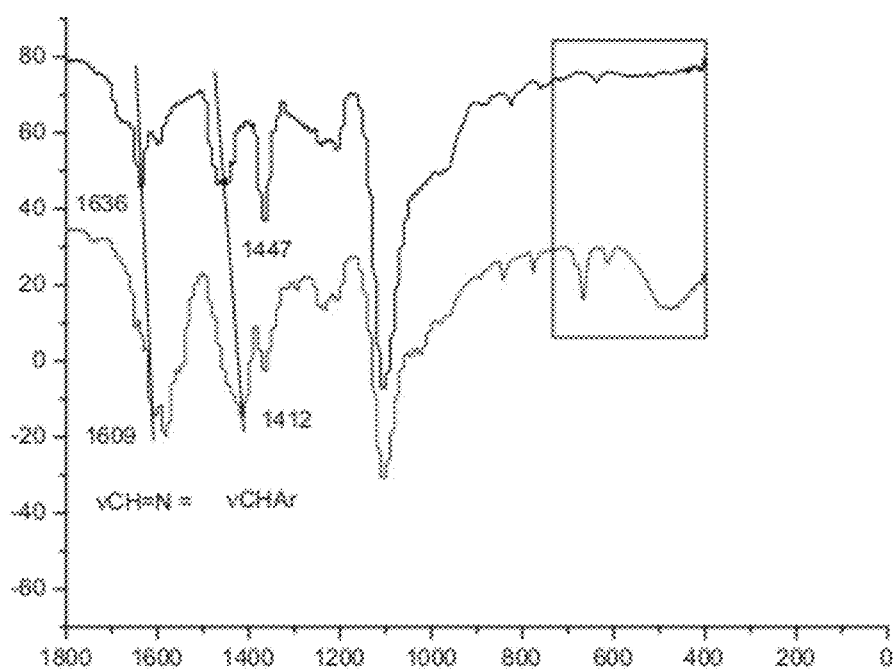
FIG. 2 is a chart showing the FTIR spectra of the membranes $M_0$ (top spectrum) and $M_2$ (bottom spectrum) where the transmittance is a function of the wavenumber ($cm^{-1}$), relating to example 1, in accordance with one embodiment.

The attached FIG. 2 shows the FTIR spectra of the membranes M$_0$ (top spectrum) and M$_2$ (bottom spectrum). In this figure, the transmittance is a function of the wavenumber (cm$^{-1}$).

By comparing the spectra of the two membranes M$_2$ and M$_0$, it is found that the vibration band $\nu_{CH=N}$=1636.54 cm$^{-1}$ the free spaces resulting from the crosslinking of the polymer chains can become filled with solvent. The degree of swelling gives an indication of the capacity of the membranes to interact with various molecules.

Experimentally, the degree of swelling was determined by the water uptake/loss method. To do this, the membranes were weighed in dry form and then after immersion in water for 5 hours, i.e. up to stabilization of the mass of the membrane, and wiping of the faces. The degree of swelling by mass G$_{mass}$ was calculated according to the relationship G$_{mass}$=(m−m$_0$)/m$_0$×100; with m$_0$=mass of the dry membrane and m: mass of the membrane after immersion in water.

The results obtained for each of the membranes are reported in Table 1 below:

TABLE 1

| Membranes | G$_{mass\ water}$ |
|---|---|
| M$_0$ | 28.7 |
| M$_{0.5}$ | 215.6 |
| M$_1$ | 432.7 |
| M$_2$ | 472.6 |

These results show that the degree of swelling increases abruptly at and above 0.5 equivalent of Zn(CH$_3$COO)$_2$ and becomes virtually constant at 1 and 2 equivalents of Zn$^{2+}$. The metal ion binds easily to the water or solvent molecules, which contributes toward the swelling of the polymer membrane.

2) Study of the Permeation and Sorption Properties of the Synthesized Membranes

Two measurements were performed to characterize the gas transport properties of the membranes synthesized in this example, i.e. with different contents of Zn$^{2+}$ ions.

Determination of the coefficients of permeability and of diffusion and also determination of the coefficients of solubility (S).

Figure 3:
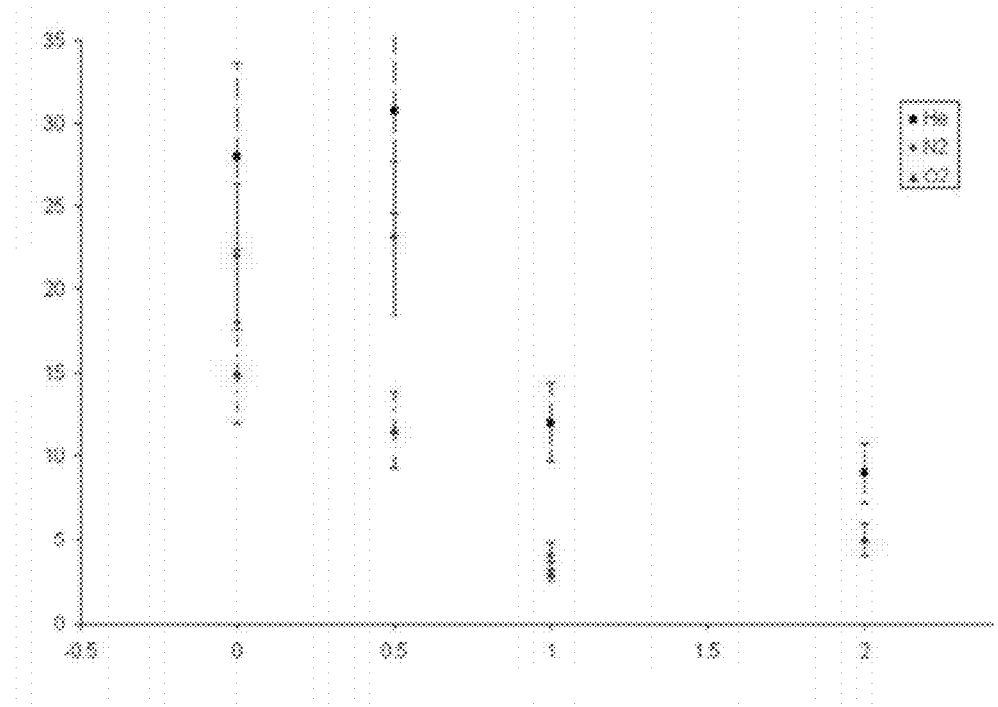
FIG. 3 is a chart showing the change in the coefficients of permeability (Barrer) of the membranes toward helium (He: solid squares), nitrogen ($N_2$: solid circles) and oxygen ($O_2$: solid triangles), as a function of the content of $Zn^{2+}$ ions (in equivalents), relating to example 1, in accordance with one embodiment.

The attached FIG. 3 shows the change in the coefficients of permeability (Barrer) of the membranes toward helium (He: solid squares), nitrogen (N$_2$: solid circles) and oxygen (O$_2$: solid triangles), as a function of the content of Zn$^{2+}$ ions (in equivalents).

Figure 4:
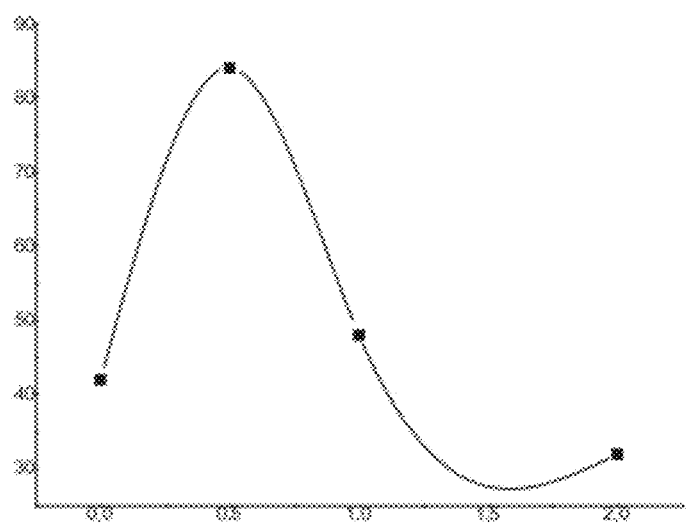
FIG. 4 is a chart showing the same measurement as per FIG. 3 performed for carbon dioxide, in which the change of the coefficients of permeability (Barrer) to carbon dioxide is a function of the content of $Zn^{2+}$ ions (in equivalents), relating to example 1, in accordance with one embodiment.

The same measurement was performed for carbon dioxide, and the results are reported in the attached FIG. 4, in which the change of the coefficients of permeability (Barrer) to carbon dioxide is a function of the content of $Zn^{2+}$ ions (in equivalents).

It may be noted that the permeability of the membranes toward $CO_2$ (32-84 Barrers) is greater than that for the other gases. These curves are bell-shaped. Although the values for the permeability to helium (2.63 Å) and to nitrogen (3.64 Å) may be explained by the effect of the size of the molecules, the high values for the permeability to $CO_2$ indicate a solubilization or interaction effect within the polymer, due to the presence of the $Zn^{2+}$ ions.

The permeability of membranes toward $CO_2$ increases from 42 to 84 Barrers in the presence of 0.5 equivalent of $Zn^{2+}$.

Figure 5:
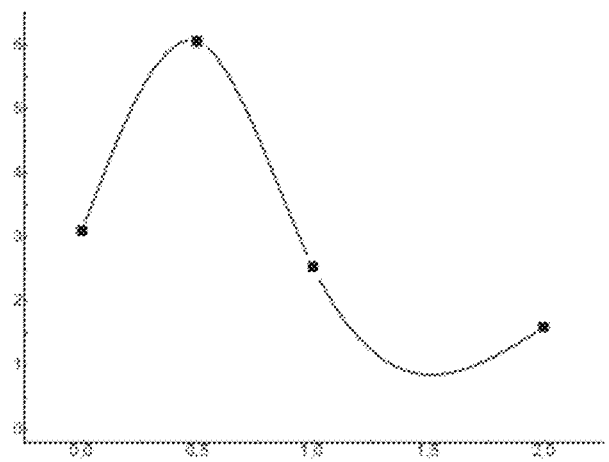
FIG. 5 is a chart showing the change in the values of the coefficients of carbon dioxide diffusion ($D_{CO2}$) ($10^{-7} \cdot cm^2 \cdot s^1$), determined by the "time-lag" method, expressed as a function of the content of $Zn^2$ ions (in equivalents), relating to example 1, in accordance with one embodiment.

The attached FIG. 5 shows the change in the values of the coefficients of carbon dioxide diffusion ($D_{CO2}$) ($10^{-7} \cdot cm^2 \cdot s^{-1}$), determined by the "time-lag" method, expressed as a function of the content of $Zn^{2+}$ ions (in equivalents).

The curve obtained is also bell-shaped, showing that the best results are obtained with membranes in which the content of $Zn^{2+}$ ions varies, with a maximum at 0.5 equivalent.

The solubility parameters in the global $CO_2$ permeability were evaluated by measuring the mass of $CO_2$ absorbed using a Cahn balance for the membranes $M_0$, $M_{0.5}$ and $M_2$.

Figure 6:
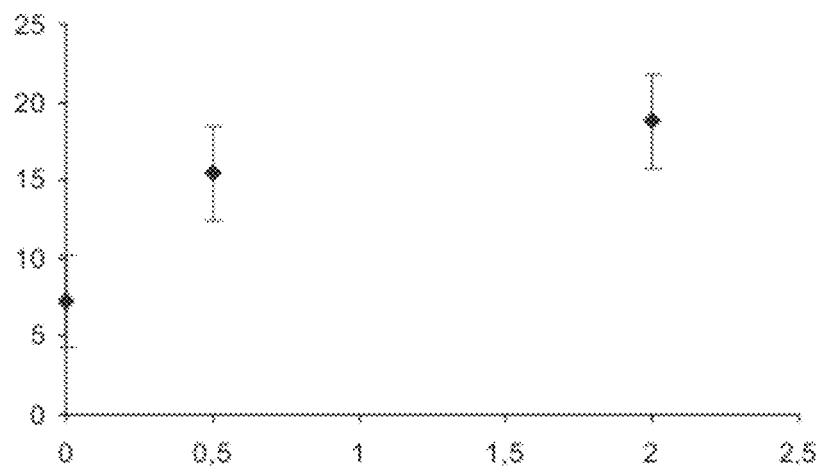
FIG. 6 is a chart showing the coefficient of sorption of $CO_2$ (S $CO_2$ $10^{-3} \cdot cm^3$ (STP)·$cm^{-1}$) is a function of the content of $Zn^{2+}$ ions (in equivalents), relating to example 1, in accordance with one embodiment.

The results obtained are shown in the attached FIG. 6, in which the coefficient of sorption of $CO_2$ ($SCO_2$ $10^{-3} \cdot cm^3$ (STP)$\cdot cm^{-1}$) is a function of the content of $Zn^{2+}$ ions (in equivalents).

These results show that the coefficients of sorption increase with the content of $Zn^{2+}$ ions in the membrane, passing from 7.25 $cm^3$ (STP) $cm^3 \cdot cm^{-1}_{Hg}$ for 0 equivalent of $Zn^{2+}$ to 18.8 $cm^3$ (STP) $cm^3 \cdot cm^{-1}_{Hg}$ for 2 equivalents of $Zn^{2+}$.

At 0.5 and 2 equivalents of $Zn^{2+}$ ions, the values of S are higher than those reported by Lin and Freeman for pure polyethylene oxide films (Journal of Membranes Science, 2004, 239, 105-117) and higher than those obtained by Stern S. A. et al. for various silicone polymers (Journal of Polymer Science B: Polymer Physical., 1987, 25, 1263-1298).

These results as a whole show that the permeability of the membranes to carbon dioxide increases with the amount of $Zn^{2+}$ up to a value close to 0.5 $Zn^{2+}$ and then drops at and above 1 equivalent of $Zn^{2+}$. However, the selectivity increases ($\alpha_{CO2/N2}=12$) and this is true also for the values of the coefficients of diffusion. The coefficients of sorption increase with the amount of added $Zn^{2+}$. These results are explained by taking two factors into account: at 0.5 equivalent of $Zn^{2+}$, the increase in the value of the coefficient of permeability is due to the presence of the $Zn^{2+}$ cation appears to interact with the carbon dioxide by creating a complexation-decomplexation phenomenon. At a higher amount, an increase in crosslinking is observed, created by the formation of numerous complexation sites. The crosslinking generally decreases the permeability.

The values for the coefficients of solubility $S_{time-lag}$ obtained in the experiments of permeability to carbon dioxide ($S=Pe/D_{exp}$) and the experimental values S' are reported in Table 2 below.

TABLE 2

| Membranes | $S_{time-lag}$ $10^{-3}(cm^3(STP)$ $cm^3 cm^{-1}_{Hg})$ | S' $10^{-3}(cm^3(STP)$ $cm^3 cm^{-1}_{Hg})$ |
|---|---|---|
| $M_0$ | 13.5 | 7.2 |
| $M_{0.5}$ | 13.1 | 12.1 |
| $M_1$ | 13.9 | — |
| $M_2$ | 20.0 | 18.8 |

The two values S and S' are very similar, thus confirming the accuracy of the measurements.

The ideal selectivities calculated from the coefficients of permeability of the membranes tested previously are reported in Table 3 below:

TABLE 3

| Ideal selectivity | Amount of $Zn^{2+}$ ions (equivalent) | | | |
|---|---|---|---|---|
| | 0 ($M_0$) | 0.5 ($M_{0.5}$) | 1 ($M_1$) | 2 ($M_2$) |
| $\alpha$ ($CO_2/He$) | 1.5 | 2.2 | 4 | 3.6 |
| $\alpha$ ($CO_2/N_2$) | 1.9 | 3 | 12 | 6.4 |

It is observed that the ideal selectivity $\alpha(CO_2/N_2)$ increases from 1.9 for the membrane $M_0$ to 12 for the membrane $M_1$. For the membrane $M_2$, the increase in the coefficient of solubility ($S=10^{-3}$ 18.8 $cm^3$ (STP) $cm^3 \cdot cm^{-1}_{Hg}$) was insufficient to compensate for the decrease in the free volume fraction (D of $M_2=1.6 \times 10^{-7} \cdot cm^2 \cdot s^{-1}$).

These results show that although the process is controlled by the sorption phenomena essentially due to $Zn^{2+}$, the diffusion parameters become more influential under the effect of crosslinking.

The membranes that combine the best performance qualities in terms of is diffusion and solubility are those obtained in the presence of an amount of Zn(II) ions of between 0.5 and 1 equivalent.

The invention claimed is:

1. A self-supporting polymeric membrane, wherein self-supporting polymeric membrane is formed from a dynamic polymer formed from repeating units of formula (I) below:

$$-\!\!+\!\!D\!-\!G\!+\!\!- \quad (I)$$

in which:

D represents a subunit of formula ($I_D$) below:

($I_D$)

[chemical structure: $=N$—propyl—$[O(CH_2)_p]_{x'}O$—propyl—$N=^*$]

in which:
x is an integer ranging from 10 to 20;
p=0 or 1; and
* is the point of attachment of D to G via an imine bond;

G represents a subunit of formula (I$_G$) below:

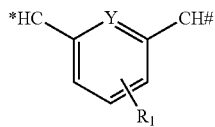

in which:
R$_1$ represents a hydrogen atom or an alkyl radical containing from 1 to 4 carbon atoms,
Y represents a nitrogen atom or C—OH,
\# is the point of attachment of G to D via an imine bond;
it being understood that at least 50% by number of said subunits of formula (I$_G$) present in said polymer form a complex with a transition metal ion.

2. The membrane as claimed in claim 1, wherein the transition metal ion is chosen from the group consisting of Zn$^{2+}$, Fe$^{2+}$, Cu$^+$, Ni$^{2+}$, Co$^{2+}$ and Ag$^+$.

3. The membrane as claimed in claim 1, wherein the alkyl radicals mentioned for the radical R$_1$ of the subunit of formula (I$_G$) are chosen from the group consisting of methyl, ethyl, n-propyl, n-butyl and t-butyl radicals.

4. The membrane as claimed in claim 3, wherein the radical R$_1$ of the subunit of formula (I$_G$) is a t-butyl radical in the para position relative to Y.

5. The membrane as claimed in claim 1, wherein the subunit (I$_G$) is chosen from the subunits (I$_{G1}$) and (I$_{G2}$) below:

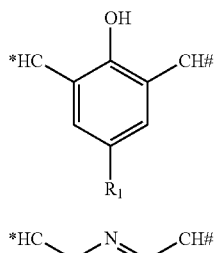

it being understood that in the subunit of formula (I$_{G1}$), the radical R$_1$ has the same meanings as those indicated in claim 1 for the subunit of formula (I$_G$).

6. The membrane as claimed in claim 1, wherein the numerical percentage of subunits of formula (I$_G$) complexed to a transition metal ion ranges from 50% to 200%.

7. The membrane as claimed in claim 1, wherein said membrane has a thickness ranging from 300 to 600 μm.

8. A process for preparing a self-supporting polymer membrane formed by at least one dynamic polymer formed from repeating units of formula (I) as defined in claim 1, wherein said process comprises the following steps:
a) the preparation of a reaction mixture comprising, in solution in at least one organic solvent:
at least one precursor of a subunit D chosen from the precursors of formula (I'$_D$) below:

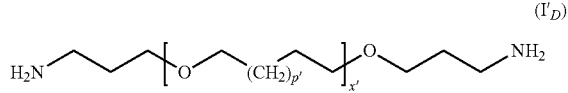

in which x' is an integer ranging from 10 to 20 and p'=0 or 1, and
at least one precursor of a subunit G chosen from the precursors of formula (I'$_G$) below:

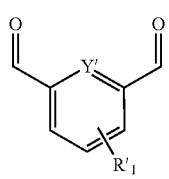

in which R'$_1$ represents a hydrogen atom or an alkyl radical containing from 1 to 4 carbon atoms and Y' represents a nitrogen atom or C—OH;
b) the polycondensation of said precursors by heating the reaction mixture to reflux to obtain a polymer formed from repeating units of formula (I'):

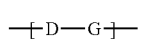

in which:
D represents a subunit of formula (I$_D$) below:

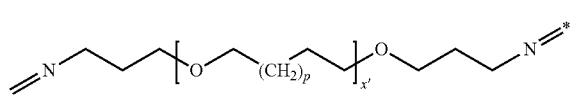

in which:
x is an integer ranging from 10 to 20;
p=0 or 1; and
\* is the point of attachment of D to G via an imine bond;
G represents a subunit of formula (I$_G$) below:

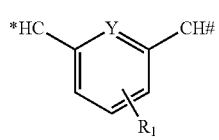

in which:
R represents a hydrogen atom or an alkyl radical containing from 1 to 4 carbon atoms,
Y represents a nitrogen atom or C—OH,
\# is the point of attachment of G to D via an imine bond;
c) the dissolution of the polymer thus obtained in an organic solvent medium to obtain a solution of polymer (Solution P), d) the dissolution of a transition metal salt of formula (II) below:

$$M_m(A)_n \qquad (II)$$

in which:
   M is a transition metal ion,
   A is a monovalent or divalent anion, and
   m and n are chosen such that the electrical neutrality of the salt is respected,
in an appropriate solvent to obtain a solution of said salt of formula (II) (solution S), e) the addition, to said solution P, of solution S, in an amount such that at least 50% by number of the subunits of formula ($I_G$) present in the polymer are complexed to a transition metal ion, f) the forming of the membrane and the evaporation of the solvent(s) from the reaction medium.

9. The process as claimed in claim 8, wherein M is a transition metal ion chosen from the group consisting of $Zn^{2+}$, $Fe^{2+}$, $Cu^+$, $Ni^{2+}$, $Co^{2+}$ and $Ag^+$.

10. The process as claimed in claim 8, wherein solution S is added to solution P in an amount such that 50% to 200% by number of the subunits of formula ($I_G$) present in the polymer are complexed with a transition metal ion.

11. The process as claimed in claim 8, wherein the anions A of the salt of formula (II) are chosen from the group consisting of acetate, trifluoromethanesulfonate, tetrafluoroborate, hexafluorophosphate, nitrate and perchlorate anions.

12. The process as claimed in claim 8, wherein the salt of formula (II) represents from 0.5 to 2 equivalents relative to the total mass of a repeating unit of formula (I').

13. The process as claimed in claim 8, wherein the solvent medium is formed by an organic solvent chosen from the group consisting of tetrahydrofuran, trichloromethane and dichloromethane, and mixtures thereof.

14. The process as claimed in claim 8, wherein the solvents of the solution S are chosen from lower alcohols and acetonitrile.

* * * * *